UNITED STATES PATENT OFFICE.

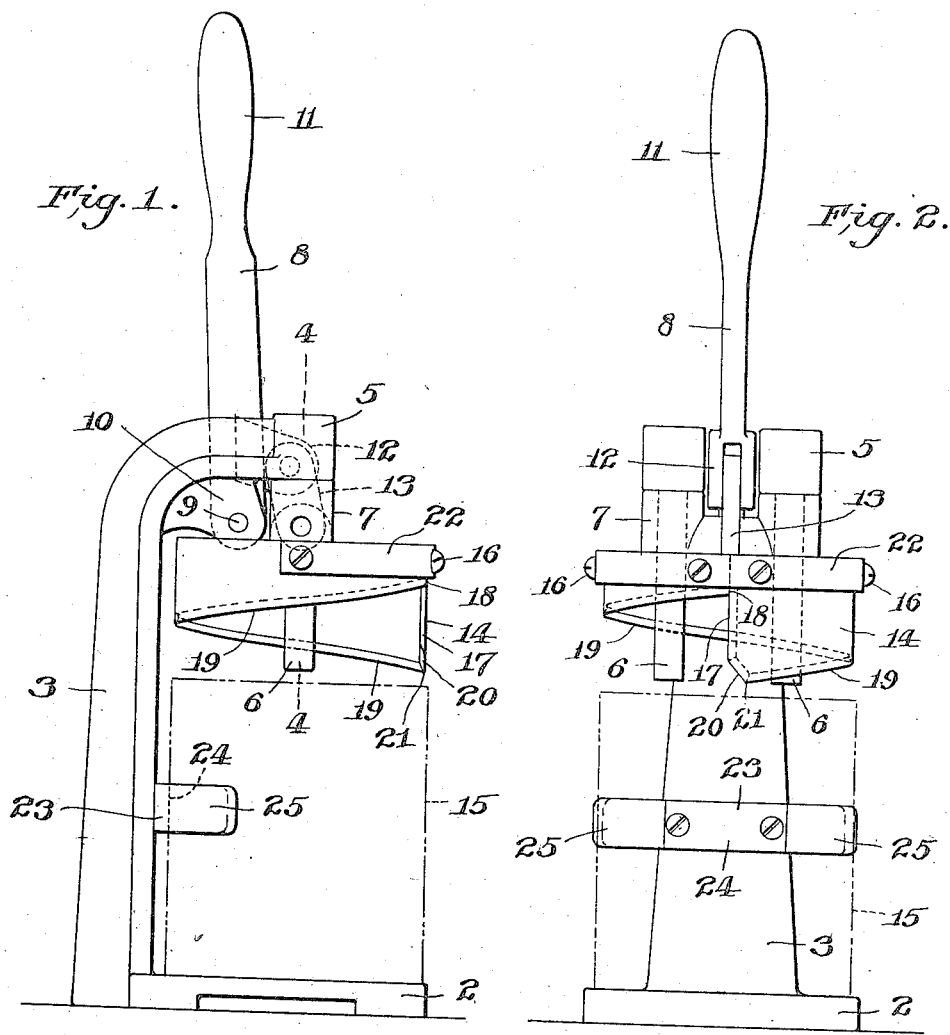

JOHN ANDERSON AND FERDINAND BERGENDORF, OF PHILADELPHIA, PENNSYLVANIA.

CUTTING DEVICE.

1,255,684.   Specification of Letters Patent.   Patented Feb. 5, 1918.

Application filed September 5, 1916. Serial No. 118,410.

*To all whom it may concern:*

Be it known that we, JOHN ANDERSON and FERDINAND BERGENDORF, citizens of the United States, residing at the city and county of Philadelphia, State of Pennsylvania, have invented certain new and useful Improvements in Cutting Devices, of which the following is a specification.

Our invention relates to improvements in cutting devices, and the primary object of our invention is to provide a novel, simple and efficient device adapted for use in opening cans, although devices made in accordance with our invention may be used for a variety of purposes. With this and other objects in view our invented device consists of the elements and the combinations of them hereinafter fully described and claimed.

In the accompanying drawings, illustrating our invention—

Figure 1 is a side elevation of a cutting device, showing one form of embodiment of our invention.

Fig. 2 is a front elevation thereof.

Fig. 3 is a plan view thereof.

Fig. 4 is a section through the knife and its carrier, on line 4—4 of Fig. 1.

Referring to the drawings, the frame of the device comprises a base plate 2, adapted to rest or to be secured upon any suitable support, and a standard 3 rising from one side of the base plate 2 and overhanging the same, as shown in the drawings.

The overhanging portion 5 of the standard 3 is provided with a pair of vertically-arranged, parallel guide pins 6 which are inserted into the portion 5 and are secured thereto and project downwardly therefrom. Slidable on these pins 6 is a vertically-movable head or carrier 7 which is guided and prevented from turning by the pins 6. The head or carrier 7 is adapted to be raised and lowered by hand and by the operation of a lever 8 which is fulcrumed, at 9, between lugs 10 on the standard 3, and which is provided on its free end with a suitable handle 11. The lever 8 is fitted to move into and from a central opening or slot in the overhanging portion 5 of the standard 3 and also to move down into and from the space between the guide pins 6, and the lever 8 is provided with projecting lugs 12 which are connected by a link 13 to the head or carrier 7. The connections of the lever 8, link 13 and carrier 7 with one another are so related that by lowering and raising the lever 8 the carrier 7 will be lowered and raised.

The head or carrier 7 carries a knife 14 which is secured thereto and projects downwardly therefrom and is adapted to act upon an object resting upon the base plate 2 beneath the knife 14 when the carrier 7 and knife 14 are lowered by the operation of the lever 8. In the drawings we have shown, by dot-and-dash lines, a can 15 resting upon the base 2 in position to be acted upon by the knife 14. The knife 14 projecting downwardly from the carrier 7 should nearly or entirely surround an open space. The knife 14, illustrated in the drawings, is made cylindrical in form and surrounds the head or carrier 7 and is secured thereto by screws 16. The bottom of the knife 14 is beveled, as shown, to form a cutting edge. The knife 14 is formed around the carrier 7 and has end portions provided with vertical edges 17 and 18 which meet each other on a vertical line. The vertical edge 17 extends downwardly from the bottom of the vertical edge 18 and the lower or cutting edge of the knife extends around the same and rises from a position adjacent to the bottom of the vertical edge 17 to a position adjacent to the bottom of the vertical edge 18. The bottom of the knife 14 has a long main cutting edge 19 and a relatively short cutting edge 20. These cutting edges are, in effect, a continuous cutting edge and they both ascend from and form a point 21 adjacent to the vertical edge 18. The short cutting edge 20 ascends to the vertical edge 17 and the long or main cutting edge 19 gradually ascends from the point 21 and follows a helical line around the cylindrical knife 14 to the bottom of the vertical edge 18 directly above the upper end of the cutting edge 20; and the vertical edge 17 is also beveled to form a cutting edge similar to the cutting edges 19 and 20.

Projecting outwardly from the knife 14 above the cutting edges 19 and 20 thereof is a stop 22 adapted to take against the object acted upon by the knife 14 and limit the downward movement thereof, after the cutting operation. This stop 22 is in the form of a strap or curved plate extending part way around the upper portion of the knife 14 and secured thereto by the screws 16 which secure the knife 14 to the carrier 7.

The guide pins 6 for the carrier 7 project below the cutting edges of the knife 14, when the knife carrier 7 is elevated, and serve to eject from within the knife, when the carrier 7 is raised, the piece or disk cut from the object acted upon by the knife when it is lowered.

To properly position a can or other object beneath the knife 14, we provide the standard 3 with a stop 23 against which the object may be set when placed upon the base plate 2. The stop 23 is located above the base plate 2 and below the knife 14 and it comprises a body portion 24 and arms 25 diverging from the respective ends of the body portion 23 and adapted to receive the object between them.

The operation of the device, briefly described, is as follows. The can 15 or other object is placed upon the base 2 and between and in contact with the inner diverging faces of the arms 25 which properly position the object beneath the knife 14. When a can 15, such as is shown by dot-and-dash lines, is placed upon the base 2 and against the stop 23, the can is positioned centrally below and in alignment with the knife 14, with the outer edge of the top of the can immediately outside of the path of the cutting edge of the knife. After the object or can 15 is thus placed upon the base 2, the lever 8 is grasped by hand and moved forwardly and downwardly on its fulcrum 9, thereby lowering the knife 14. As the knife 14 descends the point 21 thereof first enters the top of the can and then both cutting edges 19 and 20 cut the top of the can for a short distance until the cutting edge 20 passes entirely below the top of the can, whereupon the main cutting edge 19 continues the cutting operation entirely around the can; and, as the upper end of the main cutting edge passes below the top of the can, a complete disk is cut from the top thereof, thereby opening the same. The hand lever 8 is then raised to the normal position shown in the drawings, and, during the raising thereof, the knife 14 is also raised and the disk cut from the can is ejected from within the knife by the guide pins 6. The point 21 of the knife 14 enters the can immediately inside of the vertical wall of the can, and the exterior diameter of the knife is substantially equal to the interior diameter of the can, so that the entire top will be cut from the can, leaving no objectionable flange projecting inwardly from the top of the can as is usual after cans are opened by devices heretofore in use. This relationship between the diameters of the knife and can will cause the knife, during the cutting operation, to straighten any dents or irregularities that might be present in the can.

We claim:

1. In a cutting device and in combination, a supporting frame, a movable knife carrier, a knife secured to said carrier and surrounding an open space, a pair of pins projecting from said frame and into said space and to which said carrier is slidably fitted, the free ends of said pins projecting beyond the cutting edge of the knife in one position of the carrier, and means operative to move said carrier.

2. In a cutting device and in combination, a supporting frame, a movable knife carrier, a knife secured to said carrier and surrounding an open space, a pair of pins projecting from said frame and into said space and to which said carrier is slidably fitted, the free ends of said pins projecting beyond the cutting edge of the knife in one position of the carrier, a hand lever, and a link connecting said carrier and said lever, whereby when said lever is moved said carrier will be moved.

In testimony whereof we affix our signatures hereto.

JOHN ANDERSON,
FERDINAND BERGENDORF.